Feb. 5, 1946.　　　S. J. EVERETT　　　2,393,979
GLASS MANUFACTURE
Filed Nov. 22, 1941　　　2 Sheets-Sheet 1

SAMUEL JAMES EVERETT,
INVENTOR

BY Robert B Pearson
ATTORNEY

Feb. 5, 1946.  S. J. EVERETT  2,393,979
GLASS MANUFACTURE
Filed Nov. 22, 1941  2 Sheets-Sheet 2

SAMUEL JAMES EVERETT,
INVENTOR

BY Robert B. Pearson
ATTORNEY

Patented Feb. 5, 1946

2,393,979

UNITED STATES PATENT OFFICE 2,393,979

GLASS MANUFACTURE

Samuel James Everett, Thornton Heath, England, assignor to James A. Jobling & Company Limited, Sunderland, England, a British company Application November 22, 1941, Serial No. 420,121
In Great Britain February 8, 1941

5 Claims. (Cl. 49—7)

This invention relates to the manufacture of glass tubes that are to have extremely accurately shaped internal or external surfaces, that is to say to have surfaces that are absolutely true and smooth, with the fine quality that can be obtained by grinding and lapping or polishing. Glass tubing made either from ordinary glass or from low-expansion glass and having the qualities obtainable by making use of the present invention can conveniently be employed as cylinders for hypodermic syringes, and when the tubing is formed with an accurate external surface, it may be cut into lengths to be used as plungers for hypodermic syringes.

According to the invention, a tube is formed with a fine quality internal or external surface by drawing the tube over or through a former, while heating the tube only in the vicinity of the former, to make it conform accurately to the shape of the former. If the tube is to be provided with a fine quality internal surface, the initial tube or cane preferably has a greater internal diameter than the external diameter of the former, and the wall thickness of the tube is generally somewhat greater than the wall thickness of the finished tube. Then, as the heated tube is drawn over the former, the tube wall collapses upon the former due to the tension applied to the tube. The former, which of course is very accurately shaped so as to impart to the inside of the tube a true, parallel and absolutely smooth surface, may conveniently be arranged so that it projects horizontally into the furnace for heating the glass. When a tube of circular cross-section is being made, it is preferable to cause the former to rotate about its axis, but when a tube of non-circular cross-section is being shaped, the former, of course, cannot be rotated.

In order that the invention may be clearly understood and readily carried into effect, arrangements in accordance therewith will now be described, by way of example, with reference to the accompanying drawings, in which.

Figure 1:
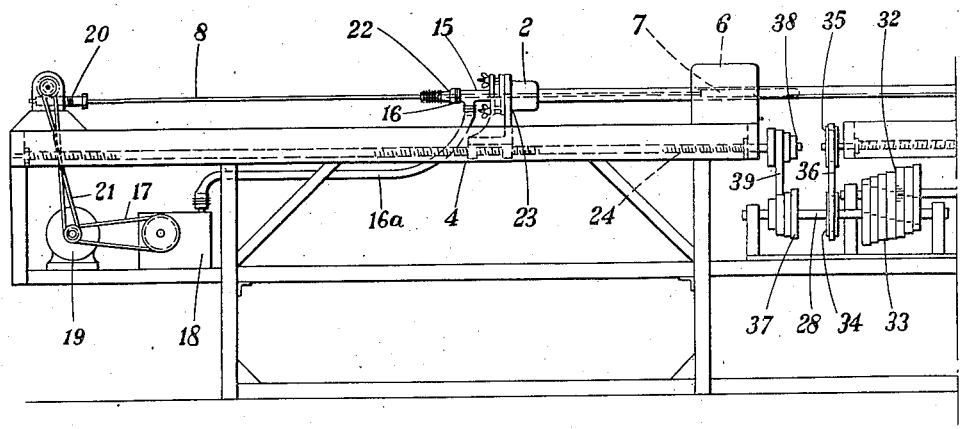
Figure 1 is a side elevation of a part of the apparatus for use when carrying the invention into effect.
Figure 1A:
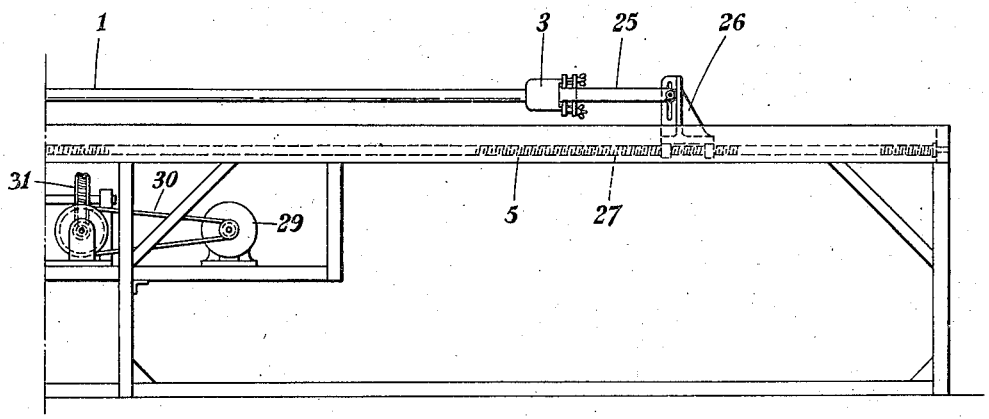
Figure 1A is a side elevation of the remaining part of the apparatus shown in Figure 1 for use when carrying the invention into effect.

The apparatus shown in Figures 1 and 1A is arranged for the purpose of shaping the internal surfaces of glass tubes, and is constructed so that the glass tube 1 being treated is supported between chucks 2 and 3, which are fed along guides 4 and 5 to carry the glass tube 1 through a furnace 6 where the tube is heated sufficiently to cause it to become plastic. The effect of this is to cause the internal surface of the tube to conform accurately to the external surface of a former 7 over which the tube passes as it travels through the furnace 6. The former 7 is carried by a rod 8 that projects through the chuck 2 and into the glass tube 1.

Figure 2:
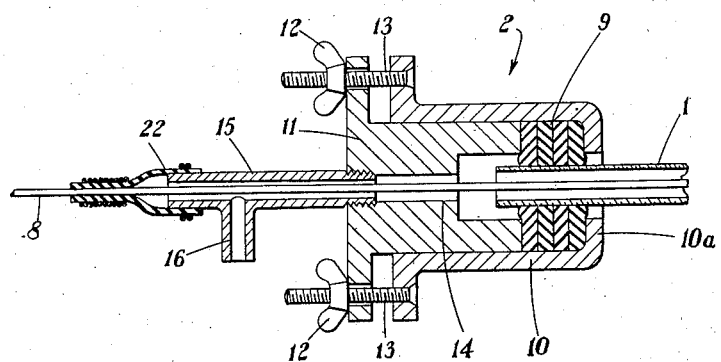
Figure 2 is a cross-section on an enlarged scale of a detail of the apparatus in Figure 1.

Each of the chucks 2 and 3 contains a pack of rubber rings 9, as shown in Figure 2 in which the details of the chuck 2 appear. The pack of rubber rings 9 is contained between an annular abutment 10a on a sleeve 10 and a gland member 11, which is tightened upon the rings 9 in an axial direction so that they expand internally and grip the tube. The axial tightening of the gland member 11 is effected through the medium of finger nuts 12 that bear on the member 11 and are threaded upon studs 13 secured to the sleeve 10. The gland member 11 is formed with a central passage 14 which receives a T-piece 15, the limb 16 of which is connected by a flexible pipe 16a to a vacuum pump 18 driven through a driving belt 17 by an electric motor 19. The rod 8 that supports the former 7 passes through the horizontal portion of the T-piece 15 to worm reduction gearing 20, whereby the motor 19, acting through a driving belt 21, is enabled to rotate the rod 8 and former 7 about their common axis.

To enable the vacuum pump 18 to maintain a reduced pressure in the pipe 1, a seal is provided between the T-piece 15 and the rod 8, the seal consisting, as shown in Figure 2, of an appropriate flexible sleeve 22 bound upon one end of the T-piece 15 and upon the rod 8. The friction between the sleeve 22 and the rod 8, however, is not so great that the latter cannot turn relatively to the sleeve.

The vacuum pump 18, by exhausting the air from inside the tube 1, prevents corrosion of the former 7, any oxygen within the tube 1 being substantially exhausted by the pump 18, and enables the outside air pressure to assist in the closing of the tube 1 on to the former 7, it being understood that the internal diameter of the tube 1 is initially slightly greater than the external diameter of the former.

It will be seen that the former 7 projects a few inches out of the furnace 6 on the discharge side thereof so as to give support to the tube until it has substantially solidified. Suitable materials for the former 7 are pure silica, the metal alloy known under the registered trade-mark "Inconell," and stainless steel. When the former is made of pure silica, it is slightly tapered in the direction of the movement of the tube. When it is made of an alloy such as stainless steel, it is convenient to use an untapered former, because, when the apparatus is in operation, the part of the former that projects from the furnace 6 is cooler than the part of the former lying within the furnace 6. The former, therefore, expands unevenly along its length and becomes slightly tapered as is required to enable the tube to be more easily drawn off the former. Furthermore, it is advantageous to coat the bore of the tube with colloidal graphite so as to enable the tube to slide more readily on the former. In the example being described the former rotates at 79 revolutions per minute and the rotation ensures that the inner surface of the tube shall be round, even if the former is not truly so (measurements of the order of 0.00001 inch being considered in this connection). It has been found advantageous to provide the rotating former with a narrow flat surface along one side so that the cross-section of the former appears as a circle with a small segment removed.

The chuck 2 is supported by a carriage 23, the speed of the carriage 23 along the guide 4 being controlled by a lead screw 24, while the glass tube 1 is drawn through the furnace 6 by the chuck 3, which is supported by forwardly extending arms 25 from a carriage 26 driven along the guide 5 by a lead screw 27. The lead screws 24 and 27 are driven from a countershaft 28, driven by a motor 29. The connection between the motor and countershaft includes a belt 30, a 19:1 worm reduction gear 31, and stepped cone pulleys 32 and 33 permitting some variation in the speed ratio between the motor 29 and the countershaft 28, so that the resultant speed at which the glass tube 1 passes through the furnace 6 may be adjusted. The arrangement is such that the pulley 32 rotates at 20 revolutions per minute and the speed of the countershaft can be varied between 10 and 20 revolutions per minute. The countershaft 28 drives the lead screw 27 at an equal speed through the medium of pulleys 34 and 35, connected by a belt 36. The gear ratio between the countershaft 28 and the other lead screw 24, however, is variable through the medium of stepped cone pulleys 37 and 38 connected by a belt 39. Therefore, the relative movement between the chucks 2 and 3 can be altered to adjust the amount the glass tube is stretched, as it passes through the furnace 6.

The threaded members on the carriages 23 and 26 are constructed so that they can be put into or out of engagement with the lead screws 24 and 27. Accordingly, the chuck 2 can readily be moved to the left, as viewed in Figure 1, and the glass cane (standard glass canes are five feet long) to be treated may be passed through the furnace 6 and over the former 7 to be secured at its left hand end in the chuck 2, the chuck 3 then being moved close to the furnace 6 so as to receive the right hand end of the tube or cane 1. The motor 19 is started, so that the former 7 is rotated and the air exhausted from the rear end of the tube 1. The two carriages 23 and 26 are locked into driving engagement with the lead screws 24 and 27 and, as soon as the furnace has softened the glass, the main motor 29 is started so that the tube 1 is fed through the furnace 6. In the case of a tube of low-expansion glass the speed with which the tube passes the furnace is controlled to heat the glass to about 800° C. The gearing between the motor 29 and the chucks 2 and 3 is such that the chuck 2 can be arranged to move at a speed of from 2½ to 10 inches per minute, while the chuck 3 can be arranged to move at a speed of from 5 to 10 inches per minute. Generally the speed ratio is so contrived that the chuck 3 moves substantially faster than the chuck 2. In action, both chucks move from left to right as viewed in Figure 1, and therefore the guide 5 is made longer than the guide 4. In an example where the initial tube or cane weighs 16 ounces and has an internal diameter of about 1" with a wall thickness of about 2½ mm. the finished tube has an accurate bore of ⅞" diameter and a wall thickness of 1¼ mm. In the treatment of this tube, therefore, its length is approximately doubled.

Figure 3:
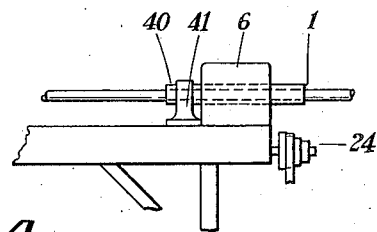
Figure 3 shows a modification of the apparatus in Figure 1.
Figure 4:
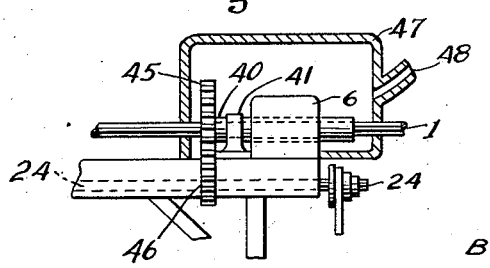
Fig. 4 is a further modification of the apparatus.

When an accurate external surface is to be formed on a tube, a hollow cylindrical former 40 (as shown in Figure 3) is supported inside the furnace and the tube 1, instead of being connected to a vacuum pump, such as the pump 18, is connected to a source of air under pressure, which may conveniently be 5 to 10 lbs. per square inch. It will be understood that the tube is only in a plastic state whilst it is passing the former 40, so that the internal air pressure only tends to expand the tube while it is within the former. Any real expansion of the external surface of the tube 1 is, of course, prevented by the former 40, but the external surface of the tube is forced to engage the internal surface of the former very closely so that it conforms to that surface. Such a hollow cylindrical former 40 may be made of pure silica or it may be made of metal. In the latter event, owing to the fact that the former is not evenly heated over its length because it projects from the furnace to give support to the tube until it is sufficiently hard, the metal former is made so that it initially tapers very slightly, with the result that when it is heated the internal passage becomes an untapered cylinder. With silica no such expedient is necessary because it does not expand appreciably when heated.

If desired, the former 40 may be arranged to rotate by mounting it in a journal bearing 41 and connecting it by suitable gearing 45, 46 with the lead screw 24.

When the external former 40 is used, the whole furnace and former assembly can be kept enveloped in a neutral gas such as burnt cracked ammonia. This will eliminate any tendency for the former or the colloidal graphite, used as a lubricant between former and tube, to become oxidised. To maintain this atmosphere the furnace 6 and former 40 may be contained in a casing 47 into which the neutral gas is introduced at an elevated pressure through conduit 48, while some escapes continuously through the openings at which the tube enters and leaves the casing. When an external former is used, however, it is not always essential to maintain this in an inert atmosphere but a revolving former made of the aforesaid "Inconell," which is a nickel-chromium alloy, may be used. To adjust the internal diameter of the tube, when a former such as the former 7 is used, it may be tapered by approximately one two thousandths of an inch in its length of approximately eight to ten inches. Then the required adjustment may be effected by moving the former longitudinally with respect to the furnace. This may be accomplished by screwing the rod 8 into the worm 20 in order to vary the position of the former slightly with respect to the area in which the glass is in a semi-plastic condition. If the former is very slightly tapered, a very slight adjustment in the diameter of the internal surface is obtained.

I claim:

1. Apparatus for forming a round glass tube with a fine quality surface, said apparatus comprising, in combination, means for supporting the front end of the tube, means for supporting the rear end thereof, means for causing said respective means to travel in the same direction at different speeds, a former supported in the path of said tube, a furnace for heating said tube only in the vicinity of said former, means for rotating the said former inside said tube in all positions of the latter during its travel over the former, and means for evacuating said tube during its travel over said former.

2. Apparatus for forming a round glass tube with a fine quality surface, said apparatus comprising, in combination, a frame, a pair of chucks movably mounted on said frame and adapted to support the respective ends of said tube, means for moving said chucks on said frame at different rates of speed in the same direction with respect to each other, a former mounted on said frame and disposed in the path of travel of said tube, and means for heating said tube only in the vicinity of said former.

3. Apparatus for forming a round glass tube as defined in claim 2, at least one of said chucks being substantially hollow and having an airtight seal with respect to that end of said tube supported therein, and means for connecting the interior of said chuck with a vacuum source for creating a vacuum therein and in said tube.

4. Apparatus for forming a round glass tube as defined in claim 2, and means for rotating said former.

5. Apparatus for forming a round glass tube as defined in claim 2, and a casing mounted on said frame and enveloping said heating means and said former, and means connected with said casing for supplying a neutral gas thereto.

SAMUEL JAMES EVERETT.